Nov. 2, 1943.    G. TRAUTVETTER    2,333,600
PANEL
Filed Feb. 12, 1940    2 Sheets-Sheet 1

INVENTOR.
George Trautvetter
BY John P. Tarbox
ATTORNEY.

Nov. 2, 1943.   G. TRAUTVETTER   2,333,600
PANEL
Filed Feb. 12, 1940   2 Sheets-Sheet 2
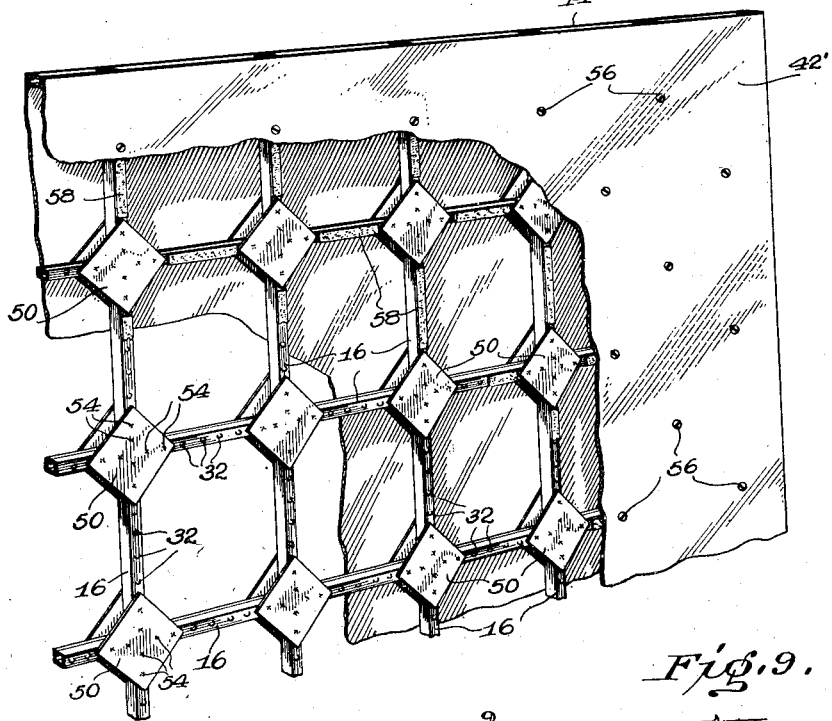
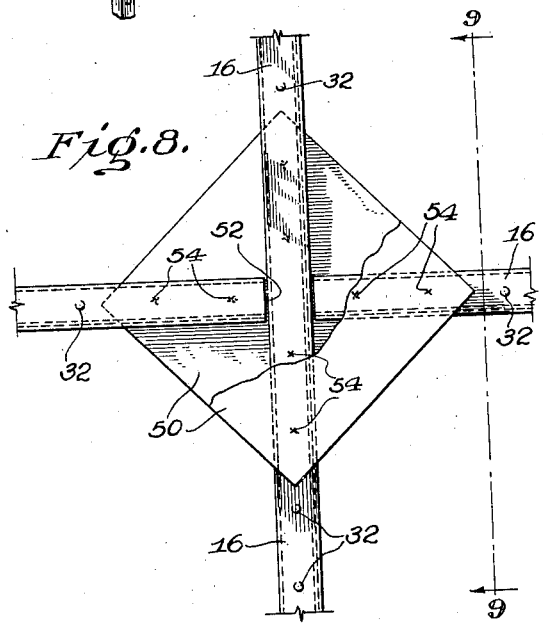
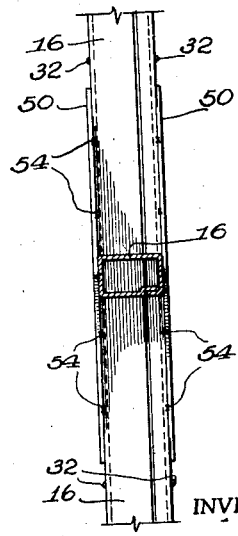
INVENTOR.
George Trautvetter
BY John P. Tarbox
ATTORNEY.

Patented Nov. 2, 1943

2,333,600

UNITED STATES PATENT OFFICE 2,333,600

PANEL

George Trautvetter, Philadelphia, Pa., assignor to Edward G. Budd Manufacturing Co., Philadelphia, Pa., a corporation of Pennsylvania Application February 12, 1940, Serial No. 318,518

10 Claims. (Cl. 189—34)

This invention relates to panel structures, and particularly sheet metal panel structures composed of spaced plates and intermediate tubular spacing members welded to the plates.

Considerable difficulty has been met in providing panel structures made from sheet metal which are relatively thin and yet which have sufficient rigidity to be used as partitions between rooms, compartments and other places where partitions are required. For example, in a railway car where space is limited it is important that partitions be relatively thin but yet sufficiently stiff and rigid to resist bending and buckling stresses which may be imposed upon them. The present invention relates to such a panel structure composed of spaced plates with interposed stiffening members in the form of rectangular tubes which may be spot welded to the plates at spaced intervals.

It is an object of the invention to provide a panel structure which may be easily fabricated from sheet metal and readily fabricated rectangular tubular members which can be secured through spot welding. Another object of the invention is to provide a panel structure which is relatively light in weight, thin yet relatively rigid, and which on both sides thereof may have a smooth finished surface.

Yet another object of the invention relates to the method of fabricating such a panel structure from plates and rectangular tubes through the use of spot welds formed from spaced projections on the tube walls and the adjacent plates in a relatively inexpensive and efficient manner.

Still another object of the invention relates to the structure of a rectangular sectioned tubular member peculiarly adapted for use in the structure referred to.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings:

Fig. 7 is a perspective view of a modified form of the invention wherein the tubular members are joined at the intersections by gussets, and a panel structure is laid thereover.

Fig. 8 is a view of an intersection prior to the application of the panelling and Fig. 9 is a section taken substantially on the line 9—9 of Figure 8.

Figure 1:
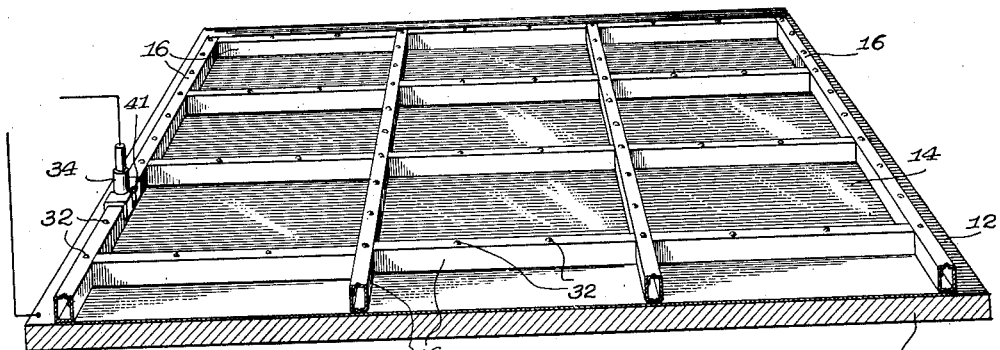
Fig. 1 is a perspective view of a panel in the process of the attachment of one panel sheet.

Referring to Fig. 1 there is illustrated a work table 10 having a smooth top surface 12 and formed of electrically conducting material so as to provide one electrical connection for welding. Laid upon the table surface 12 is a panel sheet 14 and a plurality of longitudinally and transversely arranged rectangular sectioned tubular members 16 formed of sheet metal.

Figure 2:
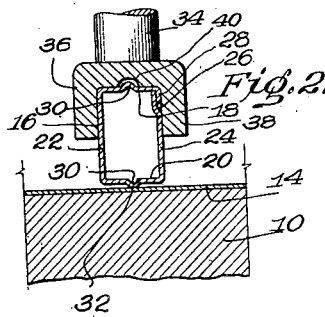
Fig. 2 is a section through the welding contactor tube and panel sheet of Fig. 1 illustrating the method of effecting welds.

Each of the tubular members is of the rectangular cross section as illustrated in Fig. 2 and has top and bottom faces 18 and 20 and side walls 22 and 24. The side wall 24 is provided with an overlapping offset 26 to produce an offset wall portion in overlapping engagement with a turned down flange 28 of the face 18. The side wall 24 extends to and supports the face 18 from the under-side thereof, and the offset 26 is preferably spaced from the edge of flange 28 to avoid any transmission of stress at this point, which might otherwise cause spreading between the flange and side wall. It will readily be observed that such a rectangular tube may be readily formed from sheet strip metal stock and in the forming process be provided with a plurality of spaced welding projections 30 arranged centrally in the top and bottom faces of the tubular member. The tubular members are formed in a particular rectangular section having a width which when compared with the gauge or thickness of the metal will provide sufficient rigidity for top and bottom faces so that upon forcing a welding projection against a face sheet of the panel under a welding pressure, the face will remain rigid and not yield. As illustrated in Fig. 2 when a weld is to be effected as at 32, pressure is applied across the rectangular section of the tubular member by means of a welding electrode 34 which forces the projection 30 into engagement with the sheet 14 resting upon the electrode table 10. Since the face 20 has sufficient rigidity to resist bending under a welding pressure, the projection 30 by reason of its contact with the sheet 14 upon the passage of a welding current therebetween becomes fused and effects a weld between the tubular member and the sheet, the resulting outer face of the sheet being left smooth by reason of its arrangement upon a smooth face 12 of the welding table.

Through the use of the welding electrode 34 which is adapted to make good electrical connection to the tubular members, the welding current is passed through the side walls of the tubular member to the welding projection without harmful heating. For this purpose the electrode 34 is provided with skirts 36 and 38 which more or less closely fit the rectangular sectional tubular member so that by maintaining the welding electrode 34 in a vertical position the rectangular sectioned tubular member may be likewise maintained in proper position during welding.

In order to protect the welding projection on the opposite face of the tubular member while the face 20 is being welded to the sheet 14, the welding electrode 34 is recessed or grooved as at 40 to prevent the possibility of any current concentrating upon the projection which would cause heating thereof and result in damaging the projection. The skirt may be cut away as at 41 to bridge the transverse members for welds at intersections.

After securing the sheet 14 to the rectangular sectioned members by welding at the various weld projections, a top sheet 42 may be laid upon the tubular members and secured to the weld projections on the faces 18 of the tubular members. Because of the difficulty in locating the weld projections, a current may be caused to flow between the top sheet and the table by reason of a broad surface marking electrode 44. Such an electrode, when pressed in engagement with the top sheet thereby forcing the top sheet against various weld projections, will cause a concentration of current flow at the point of weld projections which will serve to produce momentary heating, discoloring the metal of the outer sheet 42 thereby making it possible to locate on the outer surface of the sheet 42 the points 43 opposite welding projections on the tubular members. The current used for this purpose need not be of sufficient intensity to effect a weld but merely to produce sufficient heating to indicate the point of projection contact. If the welding projections are arranged at uniformly spaced and predetermined intervals it is only necessary to locate one of a plurality of projections and the rest may be located by suitable measuring in accordance with a predetermined distance between projections. Thereafter, welds 45 may be completed between the tubular members and the top sheet 42 through the use of a welding electrode 46 and a connection to the table electrode 10 whereby individual welds may be effected between the projections on the faces 18 and the top sheet.

Figure 6:
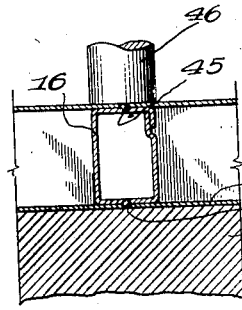
Fig. 6 is a section through the panel structure and one of the tubular spacing members.

The finished construction in section is illustrated in Fig. 6. As has been heretofore pointed out, the top and bottom faces of the tubular member have a width in comparison to their thickness such that the pressure of the welding electrode 46 is insufficient to bend the faces inwardly as a result of the welding pressure transmitted to the welding projections.

The finished panel construction may be as rigid as desired by increasing the number of tubular spacer members between the sheets and as many spot welds as may seem necessary to supply the necessary strength may be employed. In practice the projections on the opposite faces of the tubular members may be staggered with respect to one another, thus avoiding the necessity of providing a recess 40 in the welding electrode 34 and permitting a better electrical contact to the tubular member. By passing the welding current through the tubular member to the welding projections it becomes possible to weld a closed tubular member to the surface sheets without the necessity of inserting a welding electrode within the tube and by employing the proper stiffness of the tube for the width thereof, no difficulty is encountered in welding in this manner.

Figure 3:
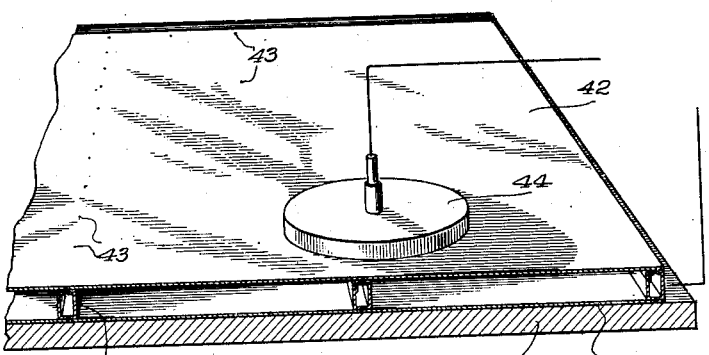
Fig. 3 is a perspective view of the panel of Fig. 1 with the top panel sheet positioned in place and illustrating a step in the method of securing the sheet.
Figure 4:
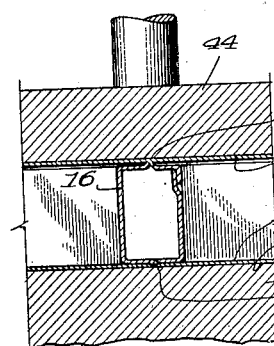
Fig. 4 is a section taken through the weld locating electrode of Fig. 3 and the panel structure immediately thereunder.
Figure 5:
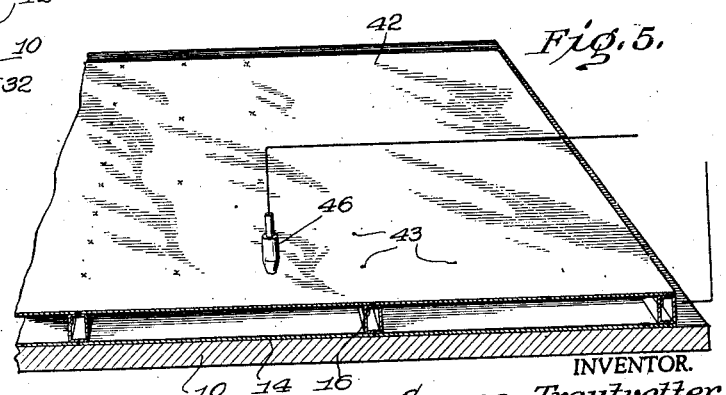
Fig. 5 illustrates the manner of finishing a panel structure.

While the modification hereinbefore described is readily adapted to the construction of panel assemblies prior to the positioning of such assembly in a wall structure or the like, Figures 7, 8 and 9 illustrate a panel construction employing the same principles of invention as that in Figures 1 to 6 but which may be completely assembled in final position. As shown in Figure 7 a plurality of tubular members 16 are arranged in a suitable framework composed of vertical and longitudinal members secured together at their intersections by gusset plates 50, the vertical members preferably extending through the joints as is illustrated in Figure 8 and the horizontal members being broken as at 52 at each joint. The tubular material as has been previously described, is provided with a sufficient number of spuds 32 along its length so that several welds may be effected betwen each gusset plate and a tubular member joined thereby as is illustrated at 54. In practice, the same type of electrodes may be employed for securing the gusset plates as those illustrated in Figures 1 to 6 or if desired all of the welds in any one gusset plate may be effected simultaneously by the use of large electrodes such as shown in Figure 3, namely 44 and 10, the electrode 10, however, being of a portable type for convenience. The panel members 14' and 42' may be secured to the framework by screw fasteners 56 of the self-threading type projecting into apertures drilled into the tubular members 16. To provide a suitable flat surface against which the panel members 14' and 42' may rest because of the thickness of the gusset members 50, flat strip material 58 may be laid along the outer faces of the tubular members 16 in between the gusset plates 50, the flat strip material being of a thickness similar to that of the gusset plates and being sufficiently soft so as to permit the intermediate unused weld projections to become embedded therein. This strip material may be of a cork-like substance and aid in sound deadening as well as prevent chaffing between the plates and the framework.

It will thus be seen that by following the methods of fabrication herein disclosed a panel structure having smooth face sheets and considerable rigidity for its thickness may be readily and inexpensively produced without limit to size.

With tubular spacing members of the sort illustrated it is not necessary to weld or otherwise secure the lapping portions 26 and 28 before the members are welded to the panel plates.

Though but two embodiments and methods of fabrication of the invention have been illustrated and described, it is to be understood that the invention is not limited thereto, but may be embodied in various equivalent forms and arrangements as may be desired. For example, the shape of the tube may be varied, or if exterior appearance be not essential the projections may be applied to the face plates or gussets instead of the tubes. As various changes in construction and arrangement of parts may be made without departing from the spirit of the invention, as will be apparent to those skilled in the art, reference will be had to the appended claims for a definition of the limits of the invention.

What I claim is:

1. A panel construction comprising a pair of spaced sheets, and spacer and stiffening members therebetween, said members being formed of sheet stock folded into tubular rectangular cross-sectioned members having their sides which are normal to said sheets, constructed to withstand spot welding compression without substantial deformation, the opposite faces of the members being spot welded to said sheets along the length of said member, said opposite faces being integrally connected by a side wall on one side and by a side wall on the other side composed of a narrow flange extending from one face toward the other and a side wall portion extending from the other face to the flanged face, said side wall portion being offset inwardly and nesting with said flange.

2. A panel construction comprising a pair of spaced sheets, and spacer and stiffening members therebetween, said members being formed of sheet stock folded into tubular rectangular cross-sectioned members having their sides which are normal to said sheets, constructed to withstand spot welding compression without substantial deformation, the opposite faces of the members being spot welded to said sheets along the length of said members, said opposite faces being integrally connected by a side wall on one side and by a side wall on the other side composed of a narrow flange extending from one face toward the other and a side wall portion extending from the other face to the flanged face, said side wall portion being offset inwardly and nesting with said flange, said sheet stock having a thickness compared to the width of the face members sufficient to provide rigidity for opposing the pressure of a welding electrode.

3. A tubular member for use in stiffening, spacing, and supporting spaced panel sheets, composed of sheet stock folded into tubular rectangular cross-sectioned members, two opposite sides of which are adapted to be spot welded to the spaced panel sheets said sheet stock having a thickness compared to the width of said sides to withstand without substantial deformation the pressure of a welding electrode on said member or panel sheet, said opposite sides being integrally connected by a side wall on one side, and by a side wall on the other side composed of a narrow flange extending from one of the first sides toward the other, and a side wall portion extending from the other of the first sides to the flanged side and being offset inwardly and nesting behind said flange.

4. A panel construction comprising a plurality of tubular rectangular sectioned spacer and stiffening members arranged in a lattice work, and forming a plurality of butt joints with respect to one another, said opposite faces being provided with welding projections, and flat gusset plates at said joints spot welded to said tubular members at said welding projections, deformable material applied to the opposite surfaces of said members of a thickness substantially that of the gusset plates, at exposed points between said gusset plates, and flat cover plates secured to said lattice work over said gusset plates and deformable material.

5. A panel stiffening member of generally rectangular cross-section and of a greater depth than width, the short sides of the member being adapted to withstand spot welding pressure without objectionable distortion of said member, one of the long sides of said member having an edge portion engaged with the inner face of one short side, bent from the opposite short side, and touching the inner face of a short flange bent from the first mentioned short side.

6. A member according to claim 5 having on said long side an offset laterally inward and of about the thickness of said flange.

7. In a panel construction comprising longitudinal and transverse stiffening members each of generally rectangular cross-section, one of said members passing through an intersection of said longitudinal and transverse members and the others substantially abutting the through member, the improvement for eliminating distortion of said panel and the necessity for straightening it following the fusion welding of said members at their intersection when said stiffening members are of such light weight as to become deformed by heat incident to such welding, which improvement comprises a gusset plate of a gauge adjacent that of said members, spot welded to both the through member and the substantially abutting members adjacent their intersection, and a panel plate secured to said members and gusset plate, and spaced from the stiffening members by said gusset plate.

8. A panel section including a metal sheet spot welded to and along a plurality of stiffening members, each of said members being tubular, having a pair of sides substantially normal to said sheet, spaced closer than their depth, and adapted to withstand the pressure incident to spot welding the sheet and member, one side of each of said members having overlapping portions of different lengths with the longer inwardly of the shorter and with the edge of the longer portion in contact with the inner face of a short side of said member whereby said longer portion is adapted to receive a part of spot welding pressure.

9. A panel stiffening member of generally rectangular, closed box section; said member having a first pair of opposite sides which are adapted to withstand welding pressure without objectionable distortion; said member having a second pair of sides extending substantially at right angles to the sides of the first pair; one of the sides of the second pair being integrally bent off from the one side of the first pair, having an edge portion engaged with the inner face of the other side of the first pair, and being at least partly overlapped by a short flange integrally bent off from the last-named side.

10. A member according to claim 9 having on said side of the second pair, which is bent off from the one side of the first pair, an offset laterally inward and of about the thickness of said flange.

GEORGE TRAUTVETTER.